Figure 1:
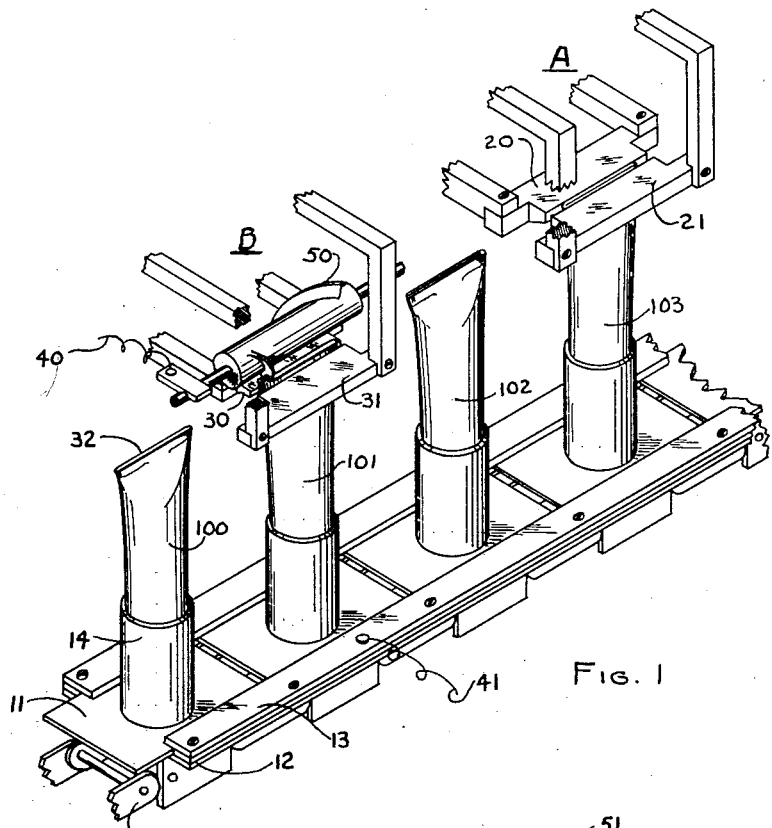

Oct. 20, 1942. J. D. HULSMANN 2,299,238
APPARATUS
Filed Jan. 12, 1940

Johannes D. Hulsmann
INVENTOR
BY Frank Wilen
ATTORNEY

Patented Oct. 20, 1942

2,299,238

UNITED STATES PATENT OFFICE 2,299,238

APPARATUS

Johannes D. Hulsmann, Paterson, N. J., assignor to E. R. Squibb & Sons, New York, N. Y., a corporation of New York Application January 12, 1940, Serial No. 313,544

5 Claims. (Cl. 219—4)

This invention relates to electric-welding apparatus, especially to electric-welding apparatus for sealing soft-metal collapsible tubes.

The electric-welding together of a plurality of sheets of metal placed side by side (hereinafter termed "edge-welding") finds many useful applications in industry. Thus, as shown and described in Patent No. 2,174,906, the open end of a soft-metal collapsible tube may be hermetically sealed by juxtaposing the opposite walls of the tube at its open end and welding the walls together at the resulting edge by moving an electrode along the edge while the tube is in a welding circuit. The electrode is then moved back to starting position, such movement being synchronized with, or involving lifting of the electrode for, passage of a new tube to welding position therebeneath. The mechanism required for thus actuating the electrode involves a large number of moving parts, and becomes undesirably complex when—as in edge-welding apparatus generally—provision is made for preventing nonuniform wear (i. e., grooving) of the electrode, e. g., by means of an auxiliary motion resulting in a continuous change of the circuit-completing-point on the electrode.

It is an object of this invention to provide simple and efficient edge-welding apparatus, especially edge-welding apparatus for sealing collapsible soft-metal tubes; and it is a further object of this invention to provide a simple nongrooving electrode device for edge-welding.

Essentially the electrode device of this invention comprises a shaft carrying a coaxial, incomplete-turn, helical electrode; and the edge-welding apparatus of this invention essentially comprises a welding circuit, means for holding an article to be edge-welded, and the above-described electrode device (for completing the circuit), rotatably mounted in such position that the electrode will traverse the edge to be welded, preferably with the axis of the electrode device parallel to the edge to be welded.

Figure 2:
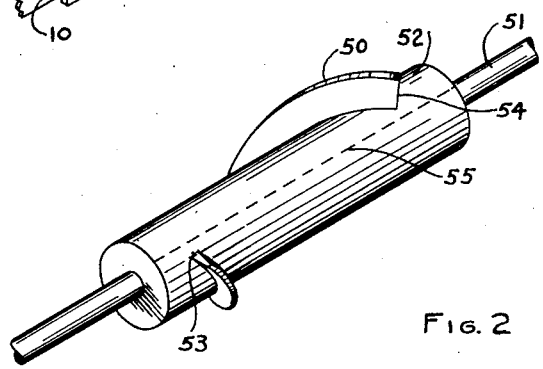

The understanding of the operation and advantages of the apparatus of this invention will be facilitated by reference to the following specification and the accompanying drawing, describing and illustrating the invention as embodied in edge-welding apparatus for sealing collapsible soft-metal tubes. In the drawing:

Fig. 1 represents a perspective view of edge-welding apparatus for sealing collapsible soft-metal tubes, embodying the invention; and Fig. 2 is an enlarged perspective view of the electrode device illustrated in Fig. 1.

The invention is illustrated as applied to a collapsible-tube-filling machine of the type described and shown in Patent No. 1,576,480, only the conveyor chain of which is shown in Fig. 1. The conveyor chain 10 has attached thereto base plates 11, each of which slides between the bottom guide plates 12 and gibs 13; to each base plate 11 there is fixed a cylindrical holder 14 for filled, collapsible soft-metal tubes 100, 101, 102, and 103; the tubes are intermittently advanced one at a time through the flattening station A and the welding station B, where, respectively, the opposite walls of each tube are juxtaposed and welded together at the resulting edge. Thus, as illustrated, tube 103 is in the flattening station A, where jaws 20 and 21 squeeze into mutual contact the opposite walls of the tube, at its open end. Then the tube is carried to the position shown by tube 102, and finally to that shown by tube 101 at welding station B, where the tube is held in jaws 30 and 31 a little below the upper edge of its juxtaposed walls while a sealing weld 32 (see tube 100) is formed by edge-welding. The welding circuit 40, 41 is completed through tube 101 and electrode 50, and may have a potential of 8–20 volts, for example. As shown in the drawing, neither the jaws 30, 31 nor the electrode 50 forms, or molds, the weld 32.

Manifestly, the flattening station A can be dispensed with, its function being transferred, upon suitable adjustment, to the jaws 30, 31 of the welding station.

The electrode device, shown enlarged in Fig. 2, consists of a shaft 51 having an enlarged cylindrical portion 52 carrying a uniform helical flange 50, the electrode. As shown, the helical flange is an incomplete turn (i. e., ends 53 and 54 thereof do not overlap, as indicated by dotted line 55 on the surface of cylinder 52). When the position of the gap 53—54 in electrode 50 is lowermost, there is a clear passage for moving the welded tube out of, and a new tube into, welding position beneath cylinder 52.

The electrode device is mounted for rotation on a horizontal axis (by conventional means, not shown) over a tube at the welding station, the electrode 50 extending below the horizontal line of tube edges to be welded. The rotation of the electrode device may be continuously in one direction (the electrode gap 53—54 being sufficiently large to permit movement of the tubes into and out of welding position without interrupting rotation); alternatively, and preferably, the rotation is discontinuously in one direction, i. e., the rotation is stopped when gap 53—54 in the electrode is lowermost, to permit movement of the tubes into and out of welding position; and, as a further alternative, the rotation may be "oscillatory," i. e., the device being rotated clockwise (as shown in Fig. 1), traversing the edge to be welded from right to left until the electrode gap 53—54 is lowermost, tubes being moved into and out of welding position, and the device then being rotated counterclockwise, traversing the edge to be welded from left to right, until the electrode gap 53—54 is again lowermost. The rotation of the helical electrode, it will readily be noted, moves a welding-circuit-completing point uniformly along the edge to be welded, and thus progressively forms a weld sealing the tube; and since the welding-circuit-completing point on the electrode is continuously and uniformly changed, the electrode wears uniformly, without grooving. Hence there is no need for the additional compensating mechanisms employed in prior devices.

The cross-sectional contour of flange 50, the pitch of its helix, and the attachment thereof to the shaft may, of course, be varied within the scope of the invention. The electrode device may obviously be adapted to effect a plurality of welds in a single rotation, e. g., by increasing the pitch of the helical electrode to enable it to traverse in one rotation a plurality of edges to be welded, or by increasing the diameter of the cylinder or helical flange, or, preferaby, by having the shaft carry a plurality of helical electrodes with their gaps aligned. Furthermore, the electrode device may be mounted so that its axis may be moved towards the line of edges to be welded, to compensate for wearing which reduces the diameter of the helix; and the device may be mounted with its axis nonparallel to the edge to be welded, for example horizontal but at right angles to the edge to be welded. The mechanical and electrical movements and parts—inter alia, wiring, jaws, timing devices, insulating means, and the like—utilized in connection with the apparatus of this invention but familiar to those skilled in the art, have not been described in detail.

It is believed that the welding operation described hereinabove is essentially arc-welding, since, on account of the thinness of the tube wall and its ready fusibility, the edge of the flattened end of the tube acts as a supply of metal to be melted and to form, by gravity, a sealing weld.

The electrode device may of course be integral, or of several parts; and the electrode (helical flange 50) may be formed of any electrode material, inter alia, metal, metal alloy, and, preferably, carbon. Naturally, the electrode device may be used for edge-welding generally, especially for edge-welding sheets of thin and/or readily-fusible metal.

The invention may be variously otherwise embodied, within the scope of the appended claims.

I claim:
1. Edge-welding apparatus essentially comprising a welding circuit, means for holding an article to be edge-welded in the circuit, and an electrode device for completing the circuit by contact with the edge to be welded comprising a shaft carrying a coaxial, incomplete-turn helical electrode, the electrode device being mounted for rotation on a stationary axis and in such position that the line of the edge to be welded is within the periphery of the helical electrode.

2. Edge-welding apparatus essentially comprising a welding circuit, means for holding an article to be edge-welded in the circuit, and an electrode device for completing the circuit by contact with the edge to be welded comprising a shaft carrying a coaxial, incomplete-turn helical electrode, the electrode device being mounted for rotation on a stationary axis parallel to the line of the edge to be welded and in such position that the line of the edge to be welded is within the periphery of the helical electrode.

3. Edge-welding apparatus essentially comprising a welding circuit, means for holding an article to be edge-welded in the circuit and with the edge to be welded horizontal, and an electrode device for completing the circuit by contact with the edge to be welded comprising a shaft carrying a coaxial, incomplete-turn helical electrode, the electrode device being mounted for rotation on a stationary axis and in such position that the line of the edge to be welded is within the periphery of the helical electrode.

4. Edge-welding apparatus for sealing collapsible soft-metal tubes, essentially comprising a welding circuit, means for holding in the circuit a filled tube with an end flattened and with the edge to be welded horizontal, and an electrode device for completing the circuit by contact with the edge to be welded, comprising a shaft carrying a coaxial, incomplete-turn helical electrode, the electrode device being mounted for rotation on a stationary axis and in such position that the line of the edge to be welded is within the periphery of the helical electrode.

5. Edge-welding apparatus, comprising a welding circuit, a welding station adapted to hold in the circuit the article to be welded, with the edge to be welded horizontal, means for intermittently moving a series of articles to be edge-welded into and out of the welding station, and an electrode device for completing the circuit by contact with the edge to be welded, comprising a shaft carrying a coaxial, incomplete-turn helical electrode, the electrode device being mounted for rotation on a stationary axis and in such position that the line of the edge to be welded is within the periphery of the helical electrode, the articles being moved into and out of the welding station through the gap in the turn of the electrode.

JOHANNES D. HULSMANN.